United States Patent
Maydan

[15] 3,703,687
[45] Nov. 21, 1972

[54] INTRACAVITY MODULATOR
[72] Inventor: Dan Maydan, Berkeley Heights, N.J.
[73] Assignee: Bell Telephone Laboratories, Incorporated, Murray Hill, Berkeley Heights, N.J.
[22] Filed: Feb. 12, 1971
[21] Appl. No.: 115,026

[52] U.S. Cl. ............331/94.5, 350/160, 350/161, 307/88.3, 250/199
[51] Int. Cl. ..........................H01s 3/05, H01s 3/10
[58] Field of Search .331/94.5; 350/160 X; 307/88.3; 250/199

[56] References Cited

UNITED STATES PATENTS

| | | | |
|---|---|---|---|
| 3,174,044 | 3/1965 | Tien | 250/199 |
| 3,602,725 | 8/1971 | DeMaria | 350/161 X |
| 3,614,462 | 10/1971 | Lean | 331/94.5 |

OTHER PUBLICATIONS

Maydan, D., J. of Applied Physics, Vol. 41, No. 4, 15 March, 1970, pp. 1552–1559.
Lean et al., IBM Tech. Discl. Bull., Vol. 11, No. 1, June 1968, pp. 52–53.
Ohtsura, Osaka Univ. Tech. Reports, Vol. 17, Oct. 1967, pp. 277–284.

*Primary Examiner*—Ronald L. Wibert
*Assistant Examiner*—R. J. Webster
*Attorney*—R. J. Guenther and Arthur J. Torsiglieri

[57] ABSTRACT

An intracavity modulator is disclosed in which a laser and an acousto-optic modulator are located in a cavity comprised of at least two high reflectivity mirrors. The geometry of the cavity is such that a beam of radiation from the laser has a waist in a region near the center of curvature of one of the mirrors. The acousto-optic modulator is located in this region. In a preferred embodiment of the invention, three mirrors are used to form a V-shaped cavity. The laser is located between two of these mirrors in one side of the V, and the acousto-optic modulator is located in the other side of the V.

13 Claims, 2 Drawing Figures

INTRACAVITY MODULATOR

BACKGROUND OF THE INVENTION

This concerns a method and apparatus for modulating a laser and in particular a method and apparatus for forming a modulated beam or modulated pulses of coherent radiation at high efficiencies and high energies.

Numerous techniques have been devised for modulating a laser. For example, the output of a laser cavity can be modulated by a mechanical or an electro-optic shutter located outside the laser cavity. The use of such shutters, however, is extremely inefficient; and the mechanical shutter is also quite slow. Relatively more efficient are techniques such as Q-switching or mode-locking in which the modulating means is a part of the laser cavity; but these techniques also have their limitations. For example, Q-switching is performed with lasers in which the upper laser level has a relatively long lifetime. The more commonly used lasers, however, such as the helium-neon, the argon and the helium-cadmium lasers, have relatively short lifetimes. Secondly, because energy is normally coupled out of the laser cavity through a partially transmissive mirror, only a small fraction of the total energy available at any one time is transmitted by the mirror. Thirdly, the maximum repetition rate at which pulses are formed by Q-switching techniques is relatively low, for example, only 30,000 pulses per second for a Nd:YAlG laser. In contrast, the minimum repetition rate at which pulses are formed by mode-locking techniques is relatively high, typically being tens of millions per second. As a result, a wide range of repetition rates cannot readily be attained with Q-switching or mode-locking techniques. Finally, in both Q-switching and mode-locking, the shape of the pulse of coherent radiation cannot ordinarily be varied in duration or intensity; and the repetition rate of the pulses can be altered only slightly.

SUMMARY OF THE INVENTION

Accordingly, it is an object of this invention to modulate a laser.

It is a further object of this invention to modulate a continuous beam of coherent radiation.

It is still a further object of this invention to form pulses of coherent radiation at high efficiencies, high energies and repetition rates that are readily varied from the very low to the very high.

It is still another object of this invention to form said pulses with varying energies at varying repetition rates.

These and other objects are achieved in a preferred embodiment of the invention by incorporating an acousto-optic modulator into a folded laser cavity. Illustratively, the folded laser cavity is defined by first and second end mirrors and a third mirror that is located in the optical path between the first and second reflectors to form a V-shaped optical path. The laser is located between the first mirror and the third. The acousto-optic modulator is located between the second mirror and the third. The second and third mirrors are spaced apart a distance equal to approximately the sum of the radius of curvature of the second mirror and the focal distance of the third mirror; and the acousto-optic modulator is located at the center of curvature of the second mirror.

To modulate the laser, a beam of radiation from the laser is directed through the acousto-optic modulator while an appropriate radio-frequency signal is applied to it to form acoustic waves that propagate substantially perpendicular to the beam of laser radiation. More precisely, the orientation of the acousto-optic modulator is such that the angle between the direction of propagation of the laser beam and a plane tangential to the acoustic waves is the Bragg angle. Because of this orientation, two diffracted laser beams are produced. One of these beams is the diffracted beam formed when radiation passes through the modulator in traveling from the third mirror to the second; and the other is the diffracted beam formed when radiation passes through the modulator from the second mirror to the third. Because the modulator is located at the center of curvature of the second mirror, the diffracted beam and the beam traveling from the third mirror to the second are reflected by the second mirror back on their original paths. As a result, the path of the two diffracted beams is the same and is sufficiently separated from the undiffracted beam that it can be extracted from the laser cavity without affecting the undiffracted portion of the beam.

When the signal applied to the acousto-optic modulator comprises of a series of pulses of radio-frequency power, the diffracted laser beams are comprised of a series of pulses of electromagnetic radiation. Because the power in the diffracted beams is directly proportional to the power in the radio-frequency signal applied to the acousto-optic modulator, the power in the diffracted beams is readily modulated by modulating the radio-frequency signal. This modulation can be a modulation of the amplitude of the radio-frequency signal or its duration. It is also possible to produce a modulated continuous beam of coherent radiation simply by applying to the acousto-optic modulator a modulated, continuous radio-frequency signal.

In general, the above-described intracavity modulator can be used to dump the energy in a laser cavity at full power either at CW or in the form of pulses having repetition rates in excess of approximately 300 kilohertz (kHz). For lower repetition rates, dumping is possible for lasers that cannot be Q-switched but only at rapidly decreasing efficiency. Lasers that can ordinarily be Q-switched can be operated at full power in the cavity dumping mode down to approximately 125 kHz; and they can also be Q-switched using the above-described apparatus at repetition rates of approximately 30 kHz and lower. Between the upper limit of the Q-switching mode of operation and the lower limit of the cavity dumping mode, such lasers are unstable at full power but will operate at less than optimum levels.

The upper limit of the pulse repetition rate in the cavity dumping mode is still undetermined. Because this limit is related to the rise time of the diffracted beam, it is expected that an upper limit of approximately 50 to 100 megahertz (MHz) will ultimately be achieved.

DETAILED DESCRIPTION OF THE DRAWING

Figure 1:
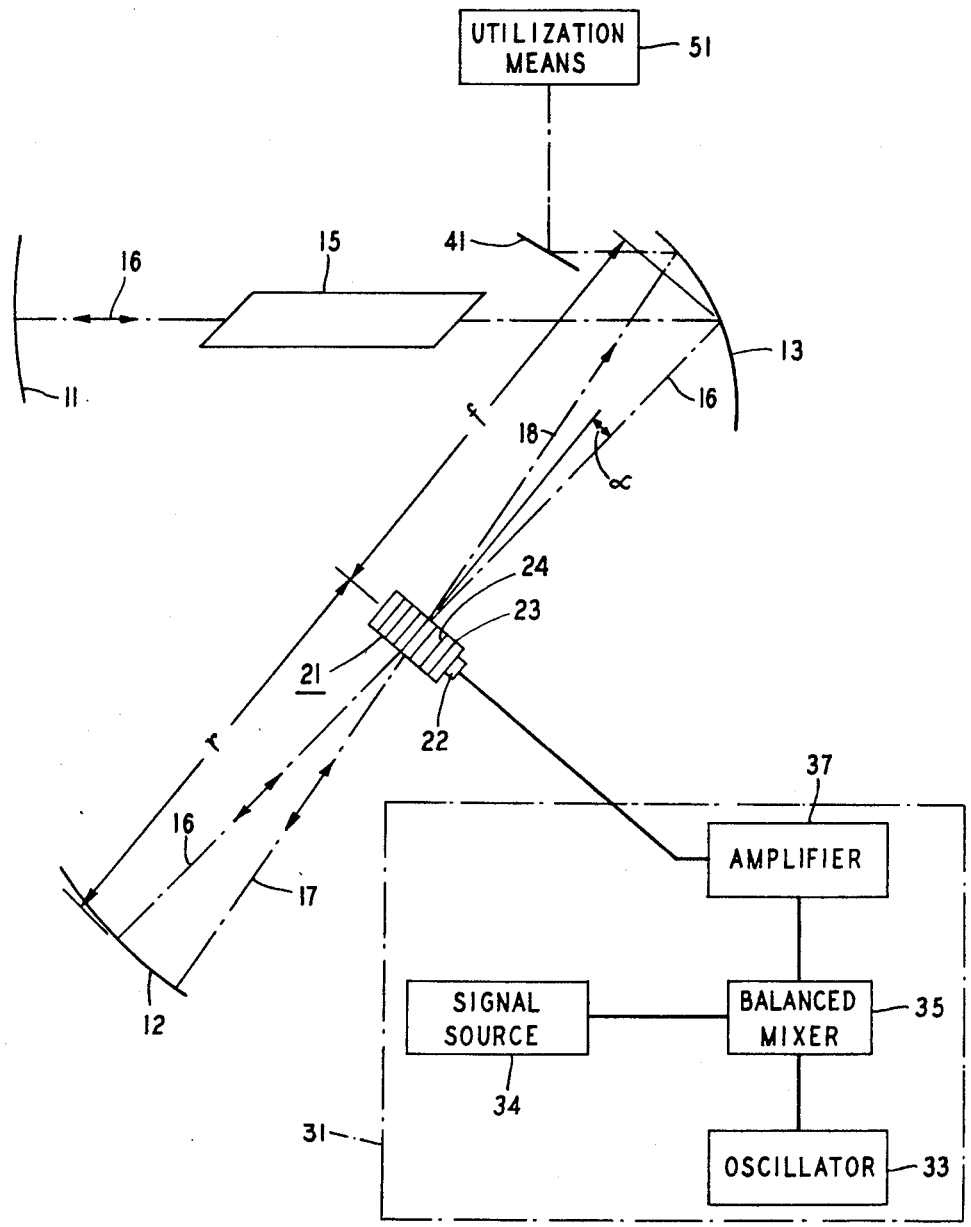
Figure 2:
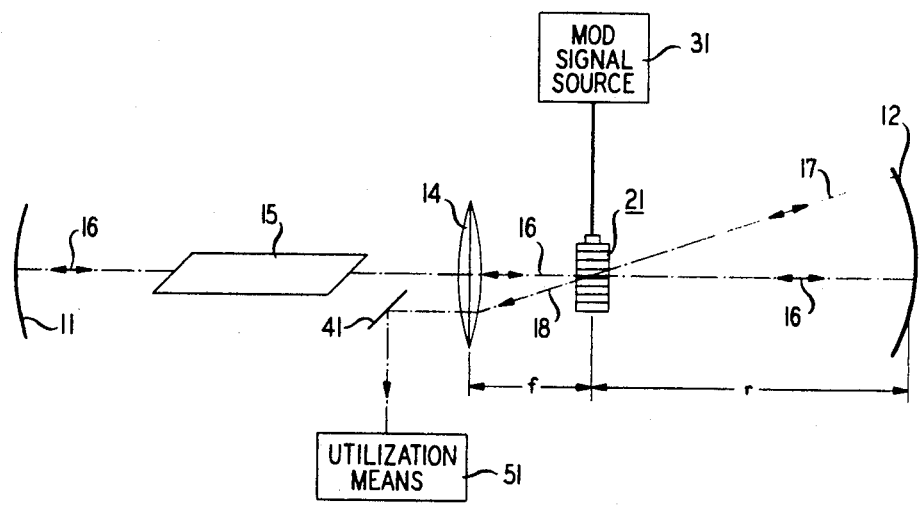

These and other objects and features of my invention will be more readily apparent from the following detailed description in which:

FIG. 1 is a schematic of an illustrative embodiment of my invention utilizing a V-shaped folded cavity; and FIG. 2 is a schematic of another embodiment of my invention utilizing a lens for producing an equivalent of a V-shaped cavity in an in-line cavity configuration. This embodiment comprises a laser cavity enclosing a suitable active medium, means for extracting energy from the laser cavity and means for utilizing said energy.

As shown in FIG. 1, the cavity comprises mirrors 11, 12, and 13 enclosing a laser medium 15. Mirrors 11, 12, and 13 should be as highly reflective as possible; and ideally they have no scattering, no absorption and no transmission. These totally reflective mirrors are arranged so that the optical path between them is essentially a V-shape. The spacing between mirrors 11 and 13 is not critical. The spacing between mirrors 12 and 13 preferably is equal to approximately the sum of the radius of curvature of mirror 12 and the focal distance of mirror 13. The laser medium that is used can be any medium suitable for the use to which my invention is applied. For convenience, the laser medium has been depicted in the drawing only in block form. Auxiliary apparatus, such as pumping means and the like, have not been shown.

The energy extracting means comprises an acousto-optic modulator 21 located at approximately the focal point of mirror 13 and the center of curvature of mirror 12, modulating signal source 31 for forming and applying to the modulator an appropriate modulating signal, and means 41 for extracting from the cavity radiation diffracted by acousto-optic modulator 21. Typically, acousto-optic modulator 21 comprises a zinc-oxide transducer 22 and a block 23 of fused silica either cut at the Brewster angle or coated with a dielectric to minimize optical losses. The use of a block cut at the Brewster angle is preferred because this block can be used with laser radiation of any wavelength. Block 23 is oriented so that acoustic waves 24 in the modulator propagate in a direction substantially perpendicular to the direction of propagation of incident electromagnetic radiation from laser 15. Beam extracting means 41 is typically a fourth highly-reflective mirror or a prism with substantially no loss.

Signal forming means 31 typically comprises a local oscillator 33, a signal source 34, a balanced mixer (or a microwave switch) 35, and an amplifier 37. All this apparatus may be standard. The output of the oscillator is amplitude modulated in mixer 35 by a signal from source 34 and the resulting modulated signal is amplified by amplifier 37 and applied to transducer 22 to create the acoustic waves 24 that propagate in modulator 21. It can be shown that the diffraction efficiency of modulator 21 is directly proportional to the power in the modulated signal applied to transducer 22. Consequently, the power and energy in the diffracted beams of coherent radiation are also proportional to the power in the amplitude-modulated signal applied to the transducer. Because the power in this amplitude-modulated signal depends in turn on the signal from signal source 34, signal source 34 controls the duration, intensity and repetition rate of the diffracted beams; and the signal from source 34 should be such as to produce the desired duration, intensity and repetition rate in the diffracted beams.

Illustratively, local oscillator 33 is a 2-milliwatt, 450 MHz, CW oscillator. The signal from source 34 typically consists of a series of fast, amplitude-modulated pulses at a high repetition rate. These pulses may be superimposed on a d.c. bias and may also have a variable duration and a variable repetition rate. Alternatively, the signal from source 34 could be an amplitude-modulated continuous wave. Amplifier 37 illustratively is capable of delivering 20 watts peak power onto a 50 ohm load. As a result, an illustrative signal delivered to transducer 23 is an amplitude-modulated 450 MHz signal in the form of a continuous wave or a series of pulses having a variable duration and repetition rate.

The utilization means, which is shown generally as element 51, can be any system in which modulated coherent radiation can be used. For example, this system could be a laser machining system, an optical memory or an optical communications system that uses modulated radiation for machining, memory writing or reading, or communications system. My invention may also be used in any number of experimental applications. A specific use of my invention is described in the concurrently filed patent application Ser. No. 115,029, titled "Recording and Display Device" assigned to Bell Telephone Laboratories, Incorporated.

To operate my invention, laser medium 15 is pumped to produce a beam of coherent electromagnetic radiation that is reflected back and forth at very low loss between mirrors 11 and 12 of the laser cavity. As indicated in the drawing, this beam travels the same V-shaped path 16 from mirror 11 to mirror 12 as it travels from mirror 12 to mirror 11; and it passes through modulator 21 twice in each round trip through the cavity. Because modulator 21 is located at the focal point of mirror 13, the beam has a very small diameter, such as 40 microns, at the modulator. While the beam of radiation is being reflected between the mirrors, the high frequency, amplitude-modulated signal from signal forming means 31 is applied to acousto-optic modulator 21. This signal is converted by transducer 22 into acoustic waves 24 propagating in silica block 23 in a direction approximately perpendicular to the direction of the beam on path 16. More precisely, the angle between the direction of propagation of the beam on path 16 and the plane tangential to the acoustic waves 24 is preferably the Bragg angle. This angle, which is shown as angle $\alpha$ in the drawing, is defined by $\sin \alpha = \lambda/2\Lambda$ where $\lambda$ is the wavelength of the beam from laser 15 and $\Lambda$ is the wavelength of acoustic waves 24. Typically, $\alpha$ is between 1° and 2°. This angle may readily be varied, if desired, by changing the frequency of the signal applied to transducer 22.

When the beam on path 16 is incident on acoustic waves 24 at the Bragg angle, it interacts with the acoustic waves to produce a diffracted beam. When the beam is traveling toward mirror 12, this interaction produces a first diffracted beam that travels toward mirror 12 on path 17 and has an angular frequency of $\omega - \Omega$ where $\omega$ is the angular frequency of the beam on path 16 and $\Omega$ is the angular frequency of acoustic waves 24. The angle between path 16 and path 17 is $2\alpha$. At a wavelength of 0.63 microns, the power that is diffracted from the beam on path 16 to the diffracted beam on path 17 is typically about one percent per watt of radio-frequency power fed into transducer 22.

Because modulator 21 is located at the center of curvature of mirror 12, both the diffracted beam and the undiffracted portion of the beam on path 16 are reflected by mirror 12 back on their incident paths 17 and 16, respectively, toward modulator 21. Both of these retro-reflected beams interact with acoustic waves 24. The undiffracted portion of the beam on path 16 produces a second diffracted beam traveling on path 18 and having an angular frequency $\omega + \Omega$. Again only a portion of the power in the beam on path 16 is diffracted into the beam on path 18; and the angle between path 18 and path 16 is $2\alpha$. In addition, modulator 21 is located at the center of curvature of mirror 12 so that path 18 forms a single straight line with path 17.

The retro-reflected diffracted beam on path 17 also interacts with acoustic waves 24 to produce a diffracted beam. The direction of this diffracted beam is coincident with the direction of the remainder of the undiffracted portion of the beam on path 16. Because the power diffracted from the beam is relatively small, most of the power diffracted into the beam path 17 remains in that beam after it passes through modulator 21. Consequently, there emerges from modulator 21 two beams propagating along path 18 toward mirror 13. One of these beams has a frequency $\omega - \Omega$ and the other beam has a frequency $\omega + \Omega$. Because these frequencies are different, the two beams do not interfere.

The diffracted beams propagating on path 18 are then incident on mirror 13 at a position that is separated from the position at which the beam on path 16 is reflected by mirror 13. Consequently, the diffracted beams can readily be separated from the undiffracted portion of the beam on path 16 and can be removed from the laser cavity without interfering with the undiffracted portion of the beam.

In practicing my invention I have used numerous lasing media as the source of coherent radiation. In particular, I have used helium-neon, argon, and helium-cadmium media as well as Nd:YAlG rod. The structure of the cavity varied with the medium I used. Typical radii of curvature of the mirrors were 300 to 1,000 centimeters for mirror 11, 20 centimeters for mirror 13, and 10 centimeters for mirror 12. When using a 120 centimeter-long helium-neon tube, the spacing between mirrors 11 and 13 was 160 centimeters. The spacing between mirrors 13 and 12, of course, was 20 centimeters, the sum of the focal length of mirror 13 and the radius of curvature of mirror 12.

Numerous modulators are available in the art for deflecting beams of electromagnetic radiation. Of these devices, I prefer to use an acousto-optic modulator because such a device permits the attainment of both very high efficiencies and high repetition rates. Because fused silica has very low optical and acoustic losses, I prefer to use this material in the modulator despite its relatively low diffraction efficiency. When the fused silica is either cut at the Brewster angle or coated with a dielectric antireflection coating, the optical power loss due to the modulator is typically less than 0.2 percent.

All the mirrors in the cavity should have the highest reflectivity possible and substantially no scattering, absorption or transmission losses. With such mirrors and the Brewster-cut and antireflection-coated modulator, the total losses in the cavity I used were below 0.5 percent.

Preferably, the modulator is located at essentially the focal point of mirror 13 or the waist of the laser beam on path 16. This position is desirable because the rise time of the diffracted beam is directly proportional to the diameter of the optical beam at the modulator and a low rise time is necessary to prevent the formation of unwanted laser modes. If the diameter of the optical beam is approximately 40 microns and the velocity of the acoustic waves is approximately $6 \times 10^5$ centimeters per second, the rise time is approximately 5 nanoseconds.

If desired, two-mirror cavities can also be used in practicing my invention. As shown in FIG. 2, by substituting a lens 14 for mirror 13, it is possible to produce the equivalent of a V-shaped cavity in an in-line configuration. In this case, the spacing between the lens and mirror 12 is approximately the sum of the focal length of the lens and the radius of curvature of mirror 12; and the acousto-optic modulator is located at the center of curvature of mirror 12. The use of a lens, however, will increase the optical losses in the cavity and for this reason such usage is not preferred. If the active laser medium is very small as it is with a dye laser, it may be possible to avoid the use of the lens or mirror that focuses the laser beam onto the acousto-optic modulator. In this case, the curvature of the two mirrors of the cavity and their spacing are such that a laser beam within the cavity has a waist near the center of curvature of one of the two mirrors. The acousto-optic modulator is located near this waist. This geometry can be realized, for example, for concave spherical mirrors that are spaced apart a distance that is approximately the sum of their radii of curvatures because the waist of the laser beam in such a case is at the common center of curvature of the mirrors.

Typical apparatus used in forming the signal applied to the transducer has been described above. Numerous other signal forming means will be obvious to those skilled in the art. For example, if amplitude modulation of the diffracted laser beam is not desired, signal source 34 may simply be a square wave pulse generator. If amplitude modulation is also desired, signal source 34 can be a square wave pulse generator plus the means necessary to amplitude modulate these pulses; or signal source 34 can be a square wave pulse generator and modulation can be supplied by modulating amplifier 37. Alternatively, signal source 34 could feed a continuous amplitude-modulated signal to mixer 35 and the output of mixer 35 could be gated by square wave pulses applied to a second mixer or a microwave switch.

Modulation of the diffracted beams might also be accomplished by modulating means external to the acousto-optic modulator. For example, means could be introduced into the cavity near mirror 11 for modulating the loss in the cavity. Means might also be used in the diffracted beams outside the cavity to modulate the amount of energy in these beams by modulating their amplitude or duration.

As has been indicated, the diffraction efficiency of the modulator is proportional to the power applied to the modulator. When the amount of modulation is relatively small, the amplitude of the diffracted optical pulse has nearly the same shape as the envelope of the radio-frequency signal applied to the transducer because the power level inside the cavity is changed very little. As the modulation is increased, the shape of the optical pulse approaches an exponential shape.

In practicing my invention with lasers, such as conventional helium-neon, argon and helium-cadmium lasers, that could not be Q-switched, I have obtained both CW and pulsed operation. At pulsed repetition rates greater than approximately 300 kHz, the maximum average power in pulsed operation was the same as the CW power capabilities of the laser. At rates below 300 kHz, pulsed operation could be obtained but only at decreasing efficiency. Typically, the peak power that could be obtained was approximately 100 times the average power. Thus, for a 20-milliwatt helium-neon laser, the peak power obtained was above 2 watts.

Lasers that could readily be Q-switched, such as the Nd:YAlG laser, could also be operated to produce a CW or a pulsed output. In this case, the maximum average power during pulsed operation was approximately the same as the CW power capabilities of the laser for repetition rates greater than approximately 125 kHz. The peak power that could be obtained was more than 100 times the average power. Thus, with a Nd:YAlG laser having a normal CW power capability of two watts, a peak power of 300 watts was obtained at a repetition rate of 125 kHz and a pulse duration of 50 nanoseconds.

It is also possible with my invention to Q-switch these lasers at lower repetition rates that vary with the particular laser medium used. In this case, a relatively long duration radio-frequency pulse is fed to the acousto-optic modulator to keep the cavity below threshold condition. When the power in the cavity reaches its maximum value, a short radio-frequency pulse is fed to the modulator to dump the energy from the cavity in a pulse that has a shape proportional to the envelope of the radio-frequency pulse. With a Nd:YAlG laser, maximum average power was obtained in Q-switched operation from approximately 10 to 30 kHz. Power could also be obtained for lower repetition rates but only at decreasing efficiencies.

As will be obvious from the preceding discussion, my invention can be used over a broad range of wavelengths with many lasers and many different types of modulators. The frequency of the signals that are applied to the modulator can be altered over a wide range of values to change the diffraction angle as suits the convenience of the practitioner of my invention. The length of each pulse that is applied to the modulator can be varied from a length slightly in excess of the rise time all the way up to CW; and the pulse repetition rate can also be varied over a wide range. Similarly, within the physical limits of the modulator that is used, the average power that is applied to the modulator can also be varied to change the diffraction efficiency of the modulator. Numerous other modifications within the spirit and scope of my invention will be obvious to those skilled in the art.

What is claimed is:
1. An optical device comprising:
   a laser medium,
   a means for pumping said medium to generate a beam of electromagnetic radiation,
   an optical cavity resonator comprising at least first and second reflectors, said medium being located within said resonator and on an optic axis thereof, said cavity resonator having a geometry such that the beam of radiation has a waist in a region near the center of curvature of said second reflector, and
   modulator means located at approximately the center of curvature of said second reflector for deflecting a first portion of said beam into a first path non-collinear with said axis and for passing undeflected a second portion of said beam along said axis upon the passage of said beam through said modulator means in one direction and for deflecting a part of said second portion of said beam into a path substantially collinear with said first path upon the passage of said second portion of said beam through said modulator means in the opposite direction along said axis, said first portion of said beam and said part of said second portion of said beam forming the output of said device.

2. The optical device of claim 1 wherein:
   the cavity resonator further comprises focusing means having a characteristic focal distance located in the optical path between said first and second reflectors;
   the second reflector and the focusing means are spaced apart a distance greater than the radius of curvature of the second reflector; and
   the laser medium is located between the first reflector and the focusing means.

3. The optical device of claim 2 wherein the second reflector and the focusing means are spaced apart a distance equal to approximately the sum of the radius of curvature of the second reflector and the focal distance of the focusing means.

4. The optical device of claim 3 wherein the modulator is an acousto-optic modulator.

5. The optical device of claim 4 further comprising means for applying a signal to the acousto-optic modulator comprising a local oscillator, a signal source, and second means for modulating the output of the local oscillator in accordance with a signal from the signal source.

6. The optical device of claim 5 wherein the laser medium is one that cannot normally be Q-switched and the signal applied to the acousto-optic modulator comprises a series of pulses having a pulse repetition rate in excess of 300 kilohertz.

7. The optical device of claim 5 wherein the laser medium is one that can normally be Q-switched and the signal applied to the acousto-optic modulator comprises a series of pulses having a pulse repetition rate in excess of 125 kilohertz.

8. The optical device of claim 5 wherein the laser medium is one that can normally be Q-switched and the signal applied to the acousto-optic modulator comprises a series of pulses at a pulse repetition rate of less than 30 kilohertz, each pulse comprising a signal that keeps the cavity below threshold until the power in the cavity reaches its maximum value and a signal that dumps the energy from the cavity, whereby the laser is Q-switched.

9. The optical device of claim 4 wherein the acousto-optic modulator comprises a transducer and a block of fused silica either cut at the Brewster angle or antireflection-coated, the focusing means is a reflector, and the first and second reflectors and the focusing means have substantially total reflectivity.

10. The optical device of claim 3 wherein said first and second reflectors and said focusing means lie along a single optic axis and said focusing means comprises a convex lens.

11. The optic axis of claim 3 wherein said resonator has a pair of optic axes intersecting one another at a point and said focusing means comprises a third reflector located at said point.

12. The optical device of claim 5 wherein said second means for modulating comprises a balanced mixer.

13. The optical device of claim 5 wherein said second means for modulating comprises a microwave switch.

* * * * *

UNITED STATES PATENT OFFICE
CERTIFICATE OF CORRECTION

Patent No. 3,703,687     Dated  November 21, 1972

Inventor(s) Dan Maydan

It is certified that error appears in the above-identified patent and that said Letters Patent are hereby corrected as shown below:

Column 4, line 48, "15 and $\lambda$" should read --15 and $\Lambda$--.
Column 5, line 19, "beam path 17" should read --beam on path 17--; line 39, "as Nd:YAlG" should read --as a Nd:YAlG--.

Signed and sealed this 22nd day of May 1973.

(SEAL)
Attest:

EDWARD M. FLETCHER, JR.              ROBERT GOTTSCHALK
Attesting Officer                     Commissioner of Patents